(12) United States Patent
Knapp

(10) Patent No.: US 6,626,612 B2
(45) Date of Patent: Sep. 30, 2003

(54) TRANSPORTING APPARATUS HAVING AN AIR CUSHION, AND METHOD OF OPERATING SUCH A TRANSPORTING APPARATUS

(75) Inventor: Wolfgang Knapp, Wettingen (CH)

(73) Assignee: ABB Research Ltd, Zurich (CH)

( * ) Notice: Subject to any disclaimer, the term of this patent is extended or adjusted under 35 U.S.C. 154(b) by 47 days.

(21) Appl. No.: 09/995,819

(22) Filed: Nov. 29, 2001

(65) Prior Publication Data

US 2002/0069785 A1 Jun. 13, 2002

(30) Foreign Application Priority Data

Dec. 11, 2000 (EP) .............................................. 00811171

(51) Int. Cl.[7] .............................................. B65G 51/16
(52) U.S. Cl. .............................. 406/19; 406/88; 406/89; 406/197; 414/676
(58) Field of Search .............................. 406/12, 19, 88, 406/89, 197; 414/676

(56) References Cited

U.S. PATENT DOCUMENTS

| | | | | |
|---|---|---|---|---|
| 3,610,695 A | | 10/1971 | Yabuta | |
| 3,648,852 A | | 3/1972 | Willuweit | |
| 4,077,507 A | | 3/1978 | Boquet | |
| 4,371,309 A | * | 2/1983 | Principe et al. | 406/19 |
| 4,896,610 A | | 1/1990 | Denne | |
| 5,246,331 A | * | 9/1993 | Hallahan et al. | 269/305 |
| 5,725,124 A | * | 3/1998 | Bustos et al. | 221/211 |
| 6,045,319 A | * | 4/2000 | Uchida et al. | 112/DIG. 2 |
| 6,074,136 A | * | 6/2000 | Steele | 406/182 |
| 6,409,434 B1 | * | 6/2002 | Winther | 406/15 |

FOREIGN PATENT DOCUMENTS

DE  19917143 A1  10/2000

* cited by examiner

*Primary Examiner*—Joseph A. Dillon
(74) *Attorney, Agent, or Firm*—Burns, Doane, Swecker & Mathis, L.L.P.

(57) ABSTRACT

A transporting apparatus includes a transporting plane and a transporting platform which can be displaced in different directions in a largely friction-free manner on an air cushion above the transporting plane, the air cushion being generated by air nozzles which are distributed in the transporting plane and are adapted to be optionally opened and closed individually in each case by a valve. Compressed air flows out of the air nozzles in the upward direction from beneath through the transporting plane, and the valves of the air nozzles and the transporting platform are designed such that they interact with one another depending on the position of the transporting platform. The valves of the air nozzles are designed as solenoid valves equipped with a magnet coil, and the transporting platform has ferromagnetic regions that interact with the magnet coils of the solenoid valves in dependence on the position of the transporting platform.

12 Claims, 4 Drawing Sheets

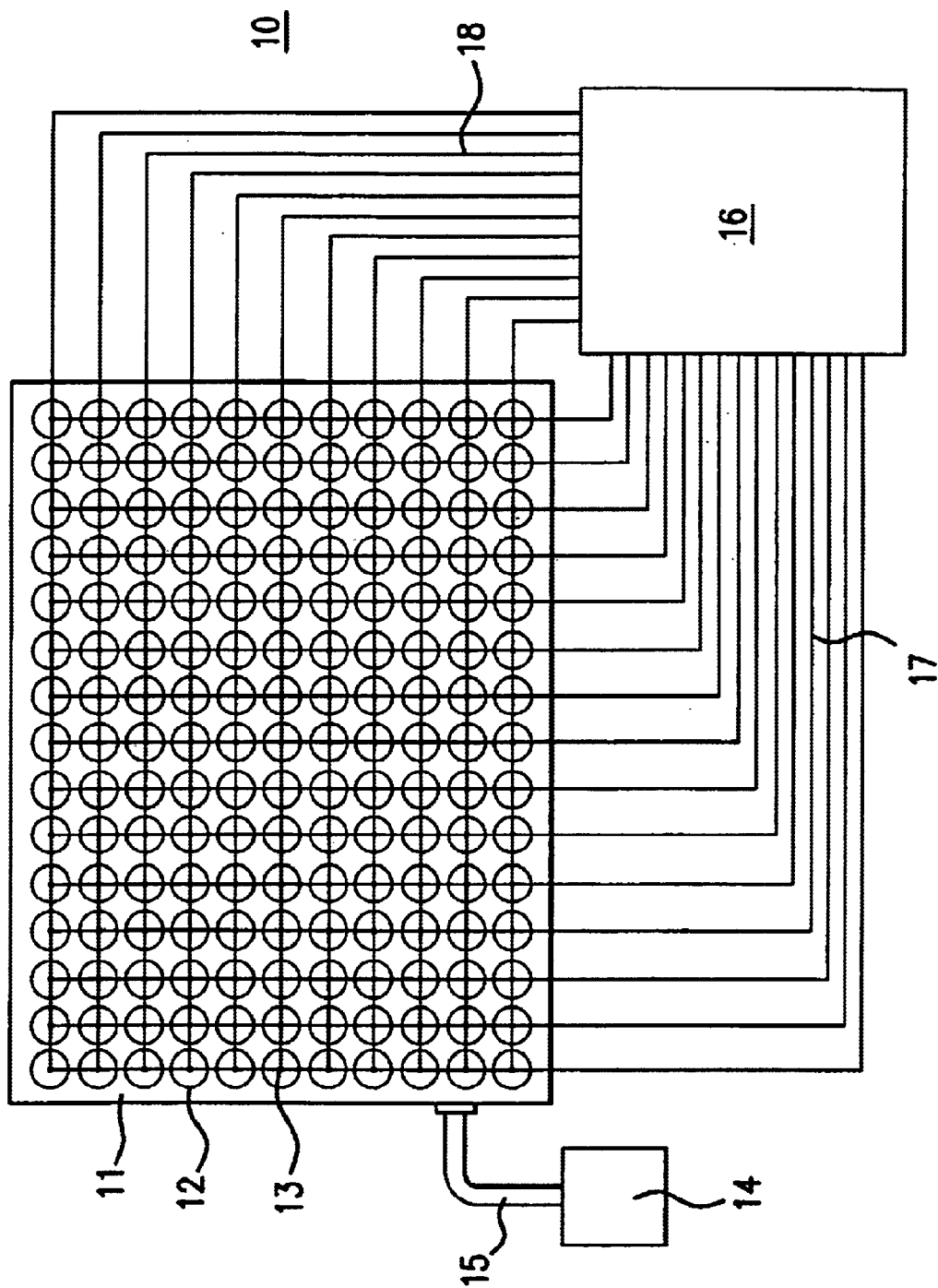

TRANSPORTING APPARATUS HAVING AN AIR CUSHION, AND METHOD OF OPERATING SUCH A TRANSPORTING APPARATUS

FIELD OF THE INVENTION

The present invention relates to the field of transport. It relates to a transporting apparatus according to the preamble of claim 1 and to a method of operating such a transporting apparatus.

A transporting apparatus of the type mentioned is known, for example, from U.S. Pat. No. 4,896,610.

BACKGROUND OF THE INVENTION

Transporting apparatuses in which a transporting platform can be moved in a largely friction-free manner by means of an air cushion generated between the transporting platform and a transporting plane have been known for some time now. It is possible here for the air cushion to be generated either by the platform itself or by an apparatus arranged beneath the transporting plane. A known example of the first-mentioned alternative is constituted by the sea-going and land-bound vehicles for passenger transport which have become known as hovercrafts.

The second-mentioned alternative is used, in particular, wherever, on the one hand, there are transporting planes with a comparatively small lateral extent present and, on the other hand, the transporting platform itself is intended to be constructed as straightforwardly as possible and without any additional installations and energy sources. U.S. Pat. No. 3,610,695 thus describes a (horizontally operating) transporting apparatus for metal plates, in the case of which the metal plate which is to be transported is mounted, and moved in a friction-free manner, on an air cushion. The air cushion is generated by air which flows out continuously into the interspace between the metal plate and transporting surface through nozzles distributed uniformly in the transporting surface. The metal plate is moved by an electromagnetically acting linear motor which is formed by coils arranged in iron cores beneath the transporting surface. The coils are activated in accordance with the current position of the metal plate, this position being determined by (optical) sensors located above the metal plate. The disadvantage with this solution is that air flows out uniformly through all the air nozzles of the transporting apparatus irrespective of where the metal plate is actually located. The disruptive arrangement of the sensors above the metal plate which is to be transported is also disadvantageous. Finally, the linear motor has the disadvantage that it is not only associated with considerable outlay, as far as its construction and operation are concerned, but is also inflexible in terms of transporting direction, because it only allows one movement direction.

A further transporting apparatus with a combination of linear motor and mounting on an air cushion is described in U.S. Pat. No. 4,077,507.

U.S. Pat. No. 3,648,852 discloses a transporting apparatus with two parallel sliding rails on which a transporting pallet can be displaced horizontally. Air channels for generating an air cushion open out in a uniformly distributed manner into the planar top surfaces of the sliding rails. The air channels are closed in each case by a ball valve, of which the ball, in the closed state of the valve, projects a little beyond the top surface of the sliding rails. The ball valves are only opened when the transporting pallet, as it slides over the valves, presses the associated balls, counter to the pressure of a spring, into the top surface of the sliding rails. This achieves the situation where only those ball valves and/or air channels which are actually required beneath the transporting pallet for forming the air cushion are activated. The disadvantage here, however, is the mechanical engagement between the transporting pallet and the valve balls, which obstructs the movement, results in wear and renders the functioning of the arrangement susceptible to disruption. It is also the case here that the movement direction is limited by the direction of the sliding rails. Furthermore, an active movement mechanism is not provided in the case of this transporting apparatus.

U.S. Pat. No. 4,896,610, mentioned in the introduction, proposes a transporting apparatus which acts in two independent directions and in the case of which air nozzles provided with valves are distributed uniformly on the transporting surface. In a manner similar to U.S. Pat. No. 3,648,852, the valves may be designed as ball valves, which are actuated mechanically by the transporting platform. However, it is also proposed (page 2, lines 34–63 of the document) to use electrically switched valves which are opened by different proximity detection systems when the platform approaches the valves. In addition to the transporting platform being mounted on a planar air cushion, a description is also given of possible ways in which the platform can be actively advanced by means of an advancement mechanism. One possibility consists in using a hydraulically actuated repulsion mechanism (FIG. 10) fitted on the platform. Another possibility for an advancement mechanism consists in using two magnetic plates on the platform which are each made to rotate by a battery-operated motor and interact with the metallic transporting surface (FIG. 11). The disadvantage here is that, on account of the advancement mechanism installed, the transporting platform has a comparatively complicated construction and requires a dedicated energy source. The fact that a wire-bound or wireless connection to the platform has to be provided in order to control the movement is also disadvantageous.

SUMMARY OF THE INVENTION

It is thus an object of the invention to provide a transporting apparatus, with air supply through the transporting plane, which avoids the disadvantages of the known transporting apparatuses, is distinguished, in particular, by simplified and functionally reliable control and can be used to realize an active movement mechanism without high outlay. It is also an object of the invention to specify a method of operating such a transporting apparatus.

The objects are achieved by the features of claims 1 and 10 taken as a whole. The core of the invention consists in designing the valves of the air nozzles as solenoid valves equipped with a magnet coil and in providing the transporting platform with ferromagnetic regions which interact with the magnet coils of the solenoid valves in dependence on the position of the transporting platform. It is thus easily possible, with a (passive) transporting platform, for the various tasks of valve control, localization and active advancement of the transporting platform to be achieved reliably via a single mechanism.

It is conceivable, in principle, for the transporting platform only to be provided with ferromagnetic regions on the periphery. By the interaction with the solenoid valves, this then establishes, in the transporting plane, the edge of an area which corresponds to the extent of the transporting platform. A control means can then determine which solenoid valves are located inside, and which are located outside, this area and can actuate one or more solenoid valves located within the area. The transporting apparatus is particularly straightforward if, according to a preferred configuration, the transporting platform is designed as a ferromagnetic carrier plate (throughout). This easily achieves interaction with all the solenoid valves located beneath the platform and/or the carrier plate.

The interaction is particularly intensive if the magnet coils of the solenoid valves are designed as ring coils and are arranged beneath the transporting plane with the coil axis perpendicular to the transporting plane, if a non-magnetic cover plate, preferably made of aluminum, is arranged between the magnet coils and the transporting plane, and the air nozzles are formed by bores in the cover plate, and if the magnet coils are arranged in each case in a yoke which is made of ferromagnetic material and is open in the direction of the transporting plane.

If the magnet coils are intended to be used, at the same time, for the active advancement of the transporting pallet, it is advantageous for the solenoid valves to be designed such that they are closed in the de-energized state of the magnet coil and open when the magnet coil is supplied with a current of suitable magnitude, it being the case that, in the de-energized state of the magnet coil, the solenoid valves are kept closed in each case by a spring element.

A maximum level of flexibility can be achieved in the case of the transporting apparatus in that the solenoid valves are connected to a control means such that they can be activated individually. It is expedient, in particular, if the solenoid valves are arranged in a two-dimensional matrix in the transporting plane and are connected to the control means via corresponding control lines which are assigned to the rows and columns of the matrix.

A preferred configuration of the method according to the invention is characterized in that the extent and/or the position of the transporting platform are/is determined from the measured inductances of the magnet coils. It is thus possible for different transporting platforms to be moved at the same time on the transporting apparatus. Active advancement of the transporting pallet can be achieved easily and without additional auxiliary means, according to one configuration of the invention, in that, utilizing the interaction between the transporting platform and the magnet coils of the solenoid valves, the transporting platform is moved in a predetermined movement direction by selected solenoid valves being switched on and off.

Further embodiments can be gathered from the dependent claims.

BRIEF DESCRIPTION OF THE DRAWINGS

The invention will be explained in more detail hereinbelow with reference to exemplary embodiments, in conjunction with the drawing, in which:

FIG. 1 shows, in a schematic illustration, the plane view of a transporting apparatus according to a preferred exemplary embodiment of the invention; the transporting platform or carrier plate has been omitted here;

DETAILED DESCRIPTION OF THE INVENTION

Figure 2A:
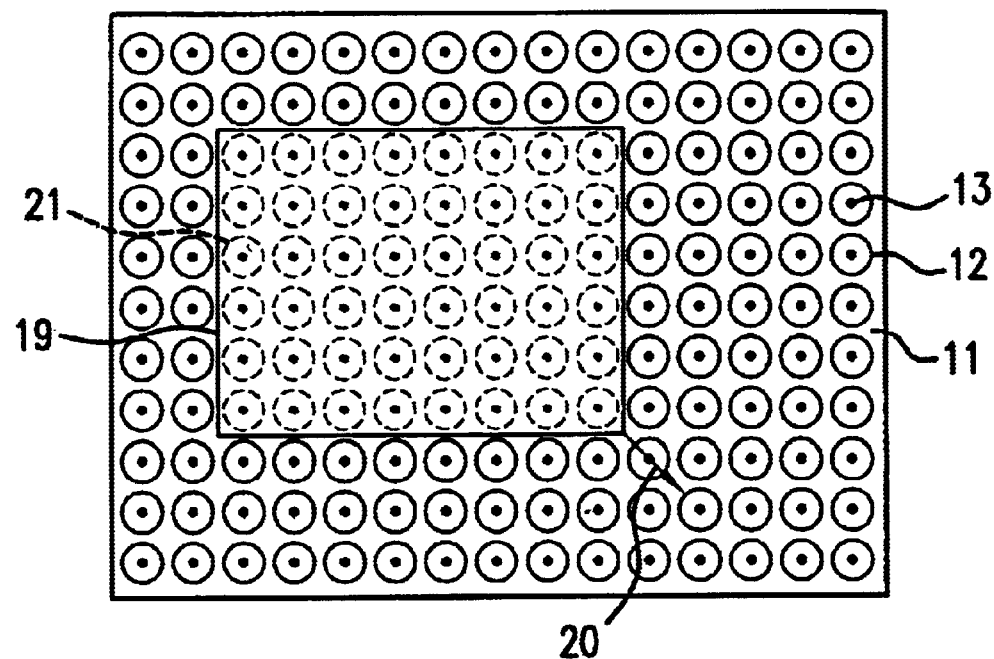
FIGS. 2a–c show, in a number of steps, the mechanism for active advancement of a transporting plate on the transporting apparatus according to FIG. 1.

FIG. 1 represents, in a schematic illustration, the plan view of a transporting apparatus according to a preferred exemplary embodiment of the invention. The transporting apparatus 10 comprises a horizontal transporting plane 11, the lateral extent of which is adapted to the respective requirements of the transporting problem which is to be solved. Provided in the transporting plane 11, in a uniformly distributed manner over the surface, are air nozzles 13 which, in the example illustrated, are arranged in rows and columns of a two-dimensional matrix. It is, of course, also possible for the air nozzles 13 to be provided in other arrangements, e.g. (hexagonally) in offset rows, in order to achieve, for example, a higher packing density and thus greater positioning accuracy. The spacing between the air nozzles 13 depends essentially on the size of the transporting platform which is to be moved on the transporting plane 11 and on the necessary positioning accuracy. The air nozzles are supplied with compressed air from an air chamber (24 in FIG. 3) located beneath the transporting plane 11, said compressed air being generated, for example, by an air pump 14 and being fed in via a connecting line 15. The air nozzles 13 are each provided with solenoid valves 12, which allow the air nozzles 13 to be opened an and closed in a controlled manner.

The solenoid valves 12, which, analogously to the air nozzles 13, form a matrix, are connected to a control means 16 via control lines 17, 18, which are assigned to the rows and columns of the matrix. If two specific control lines are selected from the group of control lines 17 and 18, that solenoid valve which is located at the crossover point of said control lines is activated. It is just as conceivable, however, for the solenoid valves 12 to be activated individually by two-wire lines or for the activating means to be positioned (in a decentralized manner) directly alongside the individual solenoid valves. The cover plate made of aluminum (25 in FIG. 3) provided and a further electrode, which is common to all the valves, may be used as electric supply lines here. It is thus possible to realize a control principle with "distributed intelligence": it is possible for the activation command for a solenoid valve to depend on the neighboring valves of the latter or to be transmitted from these valves. Direct communication with the transporting platform is also possible.

The control lines 17, 18, however, do not just serve for activating the solenoid valves 12; they also make it possible, on account of the electromagnetic interaction between the solenoid valves and the transporting platform (not shown in FIG. 1), to determine the size and position of the transporting platform. In this way, the control means obtains position-related information, on the basis of which the activation of the solenoid valves 12 can be carried out.

Figure 3:
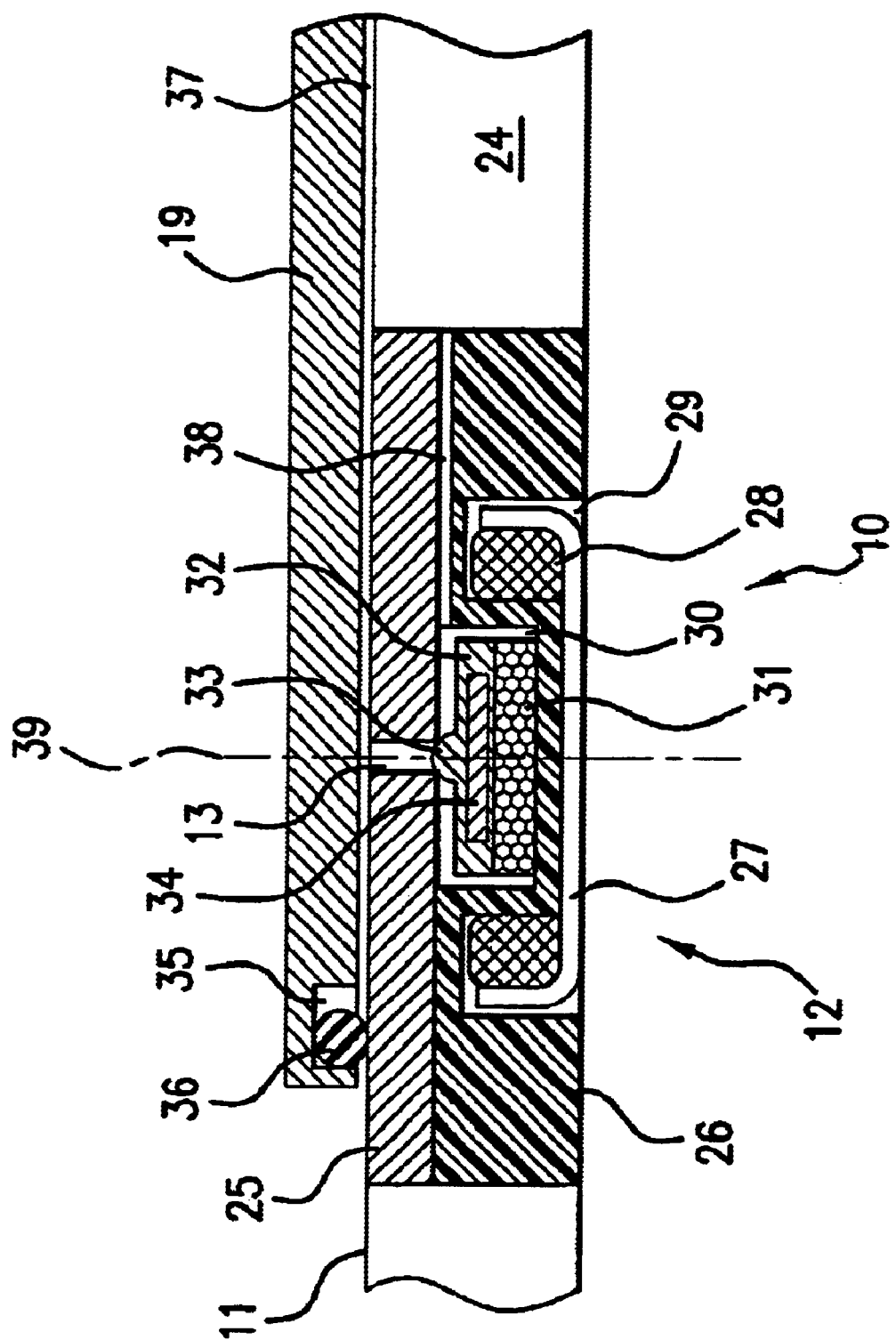
FIG. 3 shows the cross section through the transporting apparatus according to FIG. 2 in the region of an individual solenoid valve.

FIG. 3 illustrates a cross section of the construction, by way of example, of an arrangement comprising air nozzle 13 and solenoid valve 12 beneath the transporting plane 11. The solenoid valve 12 is accommodated in a carrying body 26, which is preferably produced from a suitable polymer. Introduced into the carrying body 26 from the underside onward is a first, annular recess 29, in which the magnet coil 28 of the solenoid valve is accommodated together with a ferromagnetic (cup-like) yoke 27. The axis 39 of the magnet coil 28 here is located perpendicularly to the transporting plane 11. A second, circular recess 30 is introduced into the carrying body 26, concentrically to the first recess 29, from the top side. The actual valve body 32, which has a ferromagnetic actuating element 34 in its interior, is arranged in said recess 29.

Provided above the carrying body 26 is a (round) cover plate 25 which is made of a non-magnetic material, preferably aluminum, and of which the top surface is part of the transporting plane 11 and which has, in the center (coaxially with the core axis 39), the air nozzle 13, which is configured as a vertical bore. On the top side, the valve body 32 has an integrally formed hemispherical closure part 33. Arranged beneath the valve body 32 is a spring element 31, for example in the form of a foam-rubber disk, which subjects the valve body 32 to prestressing and presses it with sealing action, by way of the closure part 33, against the bottom opening of the air nozzle 13. The second recess 30 is connected to the air chamber 24, which encloses the solenoid valve 12, via an air channel 38. If the magnet coil 28 is supplied with an appropriate current by the control means 16, the valve body 32 is drawn downward counter to the force of the spring element 31 and the compressed air flowing via the air channel 38 can flow out of the air nozzle 13 in the upward direction. If the stream through the magnet coil 28 is switched off, the spring element 31 closes the valve.

In addition to the abovedescribed actuation of the valve, the magnet coil 28 has a second essential function: if—as is shown in FIG. 3—the transporting platform, which can be displaced on the transporting plane 11, is designed as a ferromagnetic carrier plate 19, electromagnetic interaction takes place between the carrier plate 19 and the magnet coil arranged directly beneath the transporting plane 11. This interaction causes the inductance of the magnet coil 28 to change if the carrier plate 19 is displaced from a position in which it does not cover the magnet coil 28 into a position in which it wholly or partially covers the magnet coil 28, as is illustrated in FIG. 3. This change in inductance can be measured for all the solenoid valves by the control means 16. Since the magnet coils (of the solenoid valves 21 in FIG. 2) covered by the carrier plate 19 have a considerably different inductance from those which are not covered, the measurements of all of the magnet coils 28 in their entirety make it possible to determine not just the size, but also the current position, of the carrier plate 19 on the transporting plane 11. It is thus possible, in particular, for the control means 16 only to open solenoid valves which are located beneath the carrier plate 19, with the result that compressed air only flows out through the air nozzles which are effectively necessary for building up the air cushion. One open air nozzle is sufficient here, in principle, for generating the necessary air cushion. If further solenoid valves covered by the carrier plate 19 are opened, the attracting forces generated by the magnet coils reduce the carrying force of the carrier plate 19. For advancement, in contrast, only the magnet coils located at the edges are active.

If the carrier plate 19 moves in the transporting plane 11, those valves which are no longer covered by the carrier plate 19 following the movement are closed and the newly covered valves are opened. The consumption of compressed air may further be reduced if a sealing element 36 in the form of a rubber seal is provided at the edges of the carrier plate 19, in the direction of the transporting plane 11, in a sealing groove 35 provided for this purpose, said rubber seal sealing the air gap 37 between the carrier plate 19 and transporting plane 11 in the outward direction.

Figure 2B:
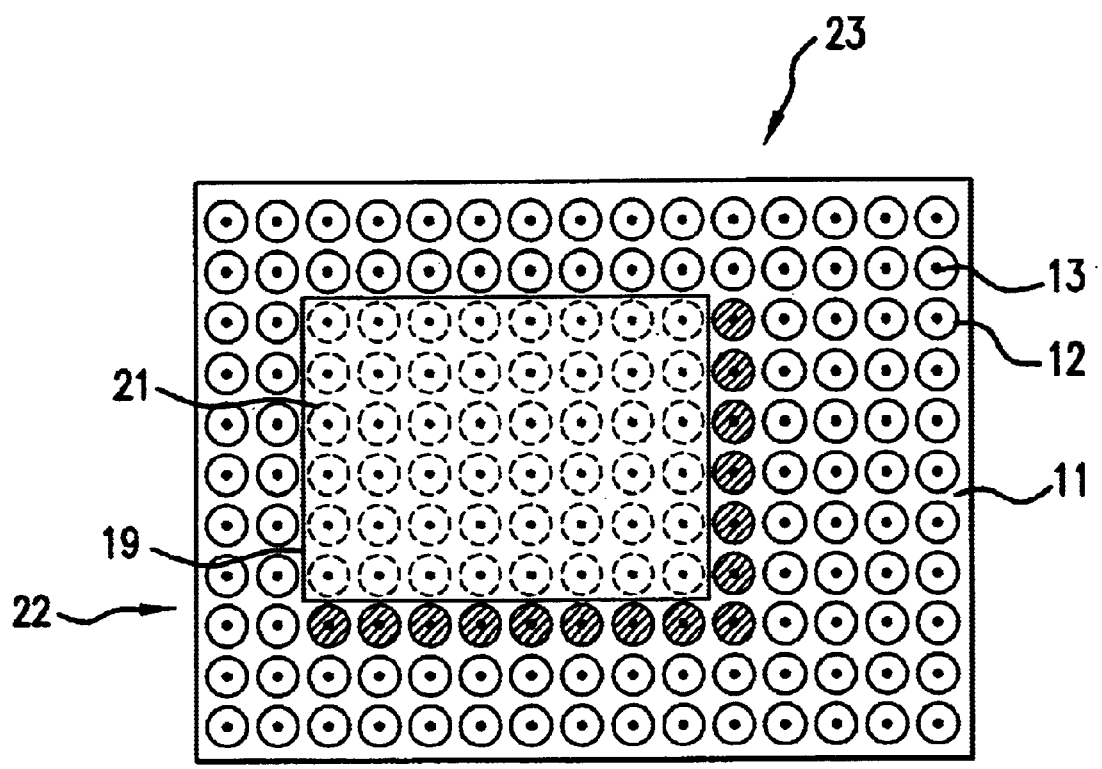
Figure 2C:
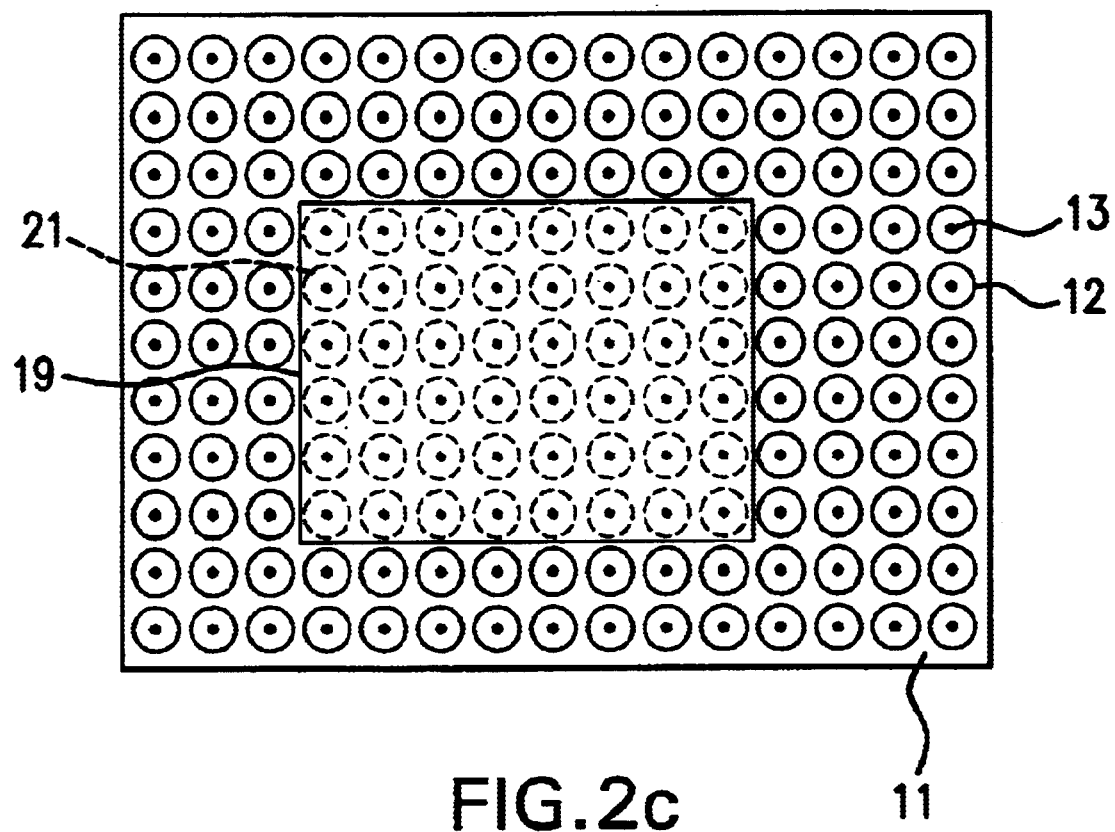

In addition to the valve-actuating function and the position-sensor function, however, the magnet coils 28 also have a third function: if those magnet coils which are located at the edge, but outside, the carrier plate 19 are supplied with current, the magnetic interaction with the carrier plate 19 in the vicinity causes the carrier plate 19 to be subjected to a force which tries to draw the carrier plate 19 in the direction of the magnet coils. Suitable activation of the magnet coils 28 and/or solenoid valves 12 thus makes it possible for the carrier plate 19 to be moved in any desired predetermined direction. Such a movement is illustrated, by way of example, in parts (a) to (c) of FIG. 2. FIG. 2(a) shows a transporting plane 11 according to FIG. 1 with a carrier plate 19 floating thereon. Some or all of the solenoid valves 21 covered by the carrier plate 19 have been switched on, while the rest of the solenoid valves have been switched off. If then, the carrier plate 19 is to be moved in the movement direction 20 indicated by the arrow, i.e. in the downward direction to the right, the valve rows 22 and 23 which are in the vicinity of the edges and are located in the movement direction are switched on (illustrated by hatching in FIG. 2(b)). As a result, the carrier plate 19 is moved in the desired direction (FIG. 2(c)). Of course, the switched-on solenoid valves which, during the movement of the carrier plate 19, are no longer covered by the latter are switched off in order to avoid obstruction of the movement by the magnet coils thereof.

Overall, the invention describes a universal system for moving extremely small to extremely heavy loads in a transporting plane. The friction is reduced here by a compressed-air cushion which is generated between the transporting plane and a ferromagnetic (soft-iron) carrier plate. The carrier plate is the load carrier. In order to minimize the air losses, the carrier plate is sealed in relation to the transporting plane all the way around by a (rubber) seal. In a manner controlled by solenoid valves, the compressed air is removed from the transporting plane through air nozzles. The solenoid valves are seated in the center of magnet coils which are distributed over the transporting plane. The quantity, size and positioning of the solenoid valves depend on the dimensions and requirements (positioning accuracy) of the loads which are to be moved.

The magnet coils generate a magnetic field in the region of the air cushion and of the carrier plate, which results in the latter being subjected to forces. Suitable activation of the magnet coils in the region beneath and around the carrier plate makes it possible for the latter to be displaced in any desired direction. Depending on the activation, it is possible to move a plurality of loads one after the other or else simultaneously (individual control). Activation of a magnet coil thus results, simultaneously, in the opening of the air nozzle and the displacement of the load, which simplifies the activation.

The arrangement thus constitutes a two-dimensional linear motor—with the transporting plane as the stator and the carrier plate as moveable pole. At the same time, use is made of the principle of a hovercraft, although the air is supplied from the "bottom". With an operating pressure of 1 bar, it is thus possible for a carrier plate of A4 size to displace a load of half a tonne.

By virtue of suitable additional devices, it is possible for a randomly positioned load to be "located" by the change in inductance of the magnet coils located therebeneath and also measured roughly (covered coils). Other sensors may possibly also be suitable.

Apart from the valve bodies (and the spring element, e.g. made of open-cell foam rubber, therebeneath), the apparatus does not have any moveable parts. The air nozzles are self-cleaning and the transporting plane may serve as a floor.

Possible applications are as follows: automation, conveying, sorting; automatic storage; loading and unloading aids for trucks; automatic configuration (conversion) of production lines; studios, stages, etc.

| List of Designations | | |
|---|---|---|
| [0034] | 10 | Transporting apparatus |
| [0035] | 11 | Transporting plane |
| [0036] | 12, 21 | Solenoid valve |
| [0037] | 13 | Air nozzle |
| [0038] | 14 | Air pump |
| [0039] | 15 | Connecting line |
| [0040] | 16 | Control means |
| [0041] | 17, 18 | Control line |
| [0042] | 19 | Carrier plate (ferromagnetic) |
| [0043] | 20 | Movement direction |
| [0044] | 22, 23 | Valve row |
| [0045] | 24 | Air chamber |
| [0046] | 25 | Cover plate (e.g. aluminum) |
| [0047] | 26 | Carrying body |
| [0048] | 27 | Yoke (ferromagnetic) |
| [0049] | 28 | Magnet coil |
| [0050] | 29 | Recess (annular) |
| [0051] | 30 | Recess (circular) |
| [0052] | 31 | Spring element (e.g. foam-rubber disk) |
| [0053] | 32 | Valve body |
| [0054] | 33 | Closure part (hemispherical) |
| [0055] | 34 | Actuating element (ferromagnetic) |
| [0056] | 35 | Sealing groove |
| [0957] | 36 | Sealing element |
| [0058] | 37 | Air gap |
| [0059] | 38 | Air channel |
| [0060] | 39 | Coil axis |

What is claimed is:

1. A transporting apparatus, comprising a transporting plane and a transporting platform which is adapted to be displaced in different directions along or across the transporting plane in a largely friction-free manner on an air cushion above the transporting plane, the air cushion being generated by air nozzles which are distributed in the transporting plane and are each adapted to be optionally opened and closed individually by means of a valve, and through which compressed air flows out in the upward direction from beneath through the transporting plane, and the valves of the air nozzles and the transporting platform being designed such that they interact with one another depending on the position of the transporting platform, wherein the valves of the air nozzles are designed as solenoid valves equipped with a magnet coil, and wherein the transporting platform has ferromagnetic regions which are adapted to interact with the magnet coils of the solenoid valves in dependence on the position of the transporting platform relative to the transporting plane, and wherein a non-magnetic cover plate is arranged between the magnet coils and the transporting plane and the air nozzles are formed by bores in the cover plate.

2. The transporting apparatus as claimed in claim 1, wherein the transporting platform is designed as a ferromagnetic carrier plate.

3. The transporting apparatus as claimed in claim 1, wherein the non-magnetic cover plate is made of aluminum.

4. The transporting apparatus as claimed in claim 1, wherein the magnet coils of the solenoid valves are designed as ring coils and are arranged beneath the transporting plane with the coil axis perpendicular to the transporting plane.

5. The transporting apparatus as claimed in claim 4, wherein the magnet coils are arranged in each case in a yoke which is made of ferromagnetic material and is open in the direction of the transporting plane.

6. The transporting apparatus as claimed in claim 1, wherein the solenoid valves are connected to a control means such that they can be activated individually.

7. The transporting apparatus as claimed in claim 6, wherein the solenoid valves are arranged in a two-dimensional matrix in the transporting plane and are connected to the control means via corresponding control lines which are assigned to the rows and columns of the matrix.

8. The transporting apparatus claimed in claim 1, wherein the solenoid valves are designed such that they are closed in the de-energized state of the magnet coil and open when the magnet coil is supplied with a current of suitable magnitude.

9. The transporting apparatus as claimed in claim 8, wherein, in the de-energized state of the magnet coil, the solenoid valves are kept closed in each case by a spring element.

10. A method of operating a transporting apparatus, the transporting apparatus comprising a transporting plane and a transporting platform adapted to be displaced in different directions along or across the transporting plane in a largely friction-free manner on an air cushion above the transporting plane, the air cushion being generated by air nozzles which are distributed in the transporting plane and are each adapted to be optionally opened and closed individually by means of a valve, and through which compressed air flows out in the upward direction from beneath through the transporting plane, and the valves of the air nozzles and the transporting platform being designed such that they interact with one another depending on the position of the transporting platform relative to the transporting plane, wherein the valves of the air nozzles are designed as solenoid valves equipped with a magnet coil, and wherein the transporting platform has ferromagnetic regions which interact with the magnet coils of the solenoid valves in dependence on the position of the transporting platform relative to the transporting plane, and wherein a non-magnetic cover plate is arranged between the magnet coils and the transporting plane and the air nozzles are formed by bores in the cover plate, the method comprising:

measuring the inductance of the magnet coils, which can be changed by the interaction of the moving transporting platform with the magnet coils of the solenoid valves; and opening solenoid valves that are located beneath the transporting platform in accordance with the measured inductance of their magnet coils in order to generate the air cushion by passage of the air through the air nozzles formed in the cover plate.

11. The method as claimed in claim 10, wherein the extent and/or the position of the transporting platform are/is determined from the measured inductances of the magnet coils.

12. The method as claimed in claim 10, wherein, utilizing the interaction between the transporting platform and the magnet coils of the solenoid valves, the transporting platform is moved in a predetermined movement direction by selected solenoid valves being switched on and off.

* * * * *